(12) United States Patent
Myers et al.

(10) Patent No.: US 8,793,110 B2
(45) Date of Patent: Jul. 29, 2014

(54) METHOD FOR PREDICTING FLUID FLOW

(75) Inventors: Rodrick D. Myers, Houston, TX (US); Peter J. Vrolijk, Houston, TX (US); Charles W. Kiven, Cypress, TX (US); Michael Tsenn, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 70 days.

(21) Appl. No.: 13/148,262

(22) PCT Filed: Dec. 3, 2009

(86) PCT No.: PCT/US2009/066607
§ 371 (c)(1),
(2), (4) Date: Aug. 5, 2011

(87) PCT Pub. No.: WO2010/104535
PCT Pub. Date: Sep. 16, 2010

(65) Prior Publication Data
US 2012/0016648 A1    Jan. 19, 2012

Related U.S. Application Data

(60) Provisional application No. 61/160,143, filed on Mar. 13, 2009, provisional application No. 61/176,735, filed on May 8, 2009.

(51) Int. Cl.
*G06G 7/48* (2006.01)
*G06G 7/50* (2006.01)
*G01V 11/00* (2006.01)

(52) U.S. Cl.
CPC ..................................... *G01V 11/00* (2013.01)
USPC .................................................. 703/9; 703/10

(58) Field of Classification Search
CPC ............ G06F 17/5009; G06F 17/5018; G06F 2217/16; E21B 43/261; E21B 33/138; E21B 34/10; E21B 34/14; E21B 21/103; G01V 11/00; G01V 99/00; G01V 99/005

USPC ........................................................ 703/9, 10
See application file for complete search history.

(56) References Cited

U.S. PATENT DOCUMENTS 4,327,290 A    4/1982    Plasek
4,781,062 A    11/1988    Taylor
(Continued)

FOREIGN PATENT DOCUMENTS

GB           2145508       3/1985
WO    WO 2007/007210    1/2007
(Continued)

OTHER PUBLICATIONS

Fisher et al. (Hydrocarbon flow across faults by capillary leakage revisited, 2001 (7 pages).*

(Continued)

*Primary Examiner* — Kamini S Shah
*Assistant Examiner* — Andre Pierre Louis
(74) *Attorney, Agent, or Firm* — ExxonMobil Upstream Research Company, Law Dept.

(57) ABSTRACT

A method for predicting fluid flow is provided. An exemplary embodiment of the method comprises obtaining data describing a stratigraphy, the stratigraphy comprising a fault, predicting a volume of shale in the fault and calculating a thickness of the fault. The exemplary method may also comprise calculating a permeability of the fault based on the volume of shale, the thickness, an estimated shale smear continuity factor and an estimated cataclastic reduction factor. The exemplary method may additionally comprise predicting fluid flow in a subsurface region based on the fault permeability.

22 Claims, 9 Drawing Sheets

(56) References Cited

U.S. PATENT DOCUMENTS

| | | | |
|---|---|---|---|
| 4,817,062 A | 3/1989 | De Buyl et al. | |
| 5,040,414 A | 8/1991 | Graebner | |
| 5,159,833 A | 11/1992 | Graebner et al. | |
| 5,251,286 A | 10/1993 | Wiener et al. | |
| 5,349,528 A | 9/1994 | Ruhovets | |
| 5,586,082 A | 12/1996 | Anderson et al. | |
| 5,600,318 A | 2/1997 | Li | |
| 5,656,930 A | 8/1997 | Hagiwara | |
| 5,757,663 A | 5/1998 | Lo et al. | |
| 5,798,982 A | 8/1998 | He et al. | |
| 5,835,882 A | 11/1998 | Vienot et al. | |
| 5,848,379 A | 12/1998 | Bishop | |
| 5,992,228 A | 11/1999 | Dunham | |
| 6,014,343 A | 1/2000 | Graf et al. | |
| 6,138,076 A | 10/2000 | Graf et al. | |
| 6,140,816 A | 10/2000 | Herron | |
| 6,246,963 B1 | 6/2001 | Cross et al. | |
| 6,370,491 B1 | 4/2002 | Malthe-Sorenssen et al. | |
| 6,393,906 B1 | 5/2002 | Vityk et al. | |
| 6,470,274 B1 | 10/2002 | Mollison et al. | |
| 6,493,632 B1 | 12/2002 | Mollison et al. | |
| 6,514,915 B1 | 2/2003 | Beyer et al. | |
| 6,529,833 B2 | 3/2003 | Fanini et al. | |
| 6,661,000 B2 | 12/2003 | Smith et al. | |
| 6,711,502 B2 | 3/2004 | Mollison et al. | |
| 6,754,588 B2 | 6/2004 | Cross et al. | |
| 6,791,900 B2 | 9/2004 | Gillard et al. | |
| 6,792,354 B1 | 9/2004 | O'Meara | |
| 6,807,487 B2 | 10/2004 | Khan | |
| 6,810,332 B2 | 10/2004 | Harrison | |
| 6,826,483 B1 | 11/2004 | Anderson et al. | |
| 6,950,751 B2 | 9/2005 | Knobloch | |
| 6,980,940 B1 | 12/2005 | Gurpinar et al. | |
| 6,985,816 B2 | 1/2006 | Sorrells | |
| 6,985,841 B2 | 1/2006 | Barroux | |
| 7,031,891 B2 | 4/2006 | Malthe-Sorenssen | |
| 7,043,410 B2 | 5/2006 | Malthe-Sorenssen | |
| 7,054,752 B2 | 5/2006 | Zabalza-Mezghani et al. | |
| 7,069,149 B2 | 6/2006 | Goff et al. | |
| 7,079,953 B2 | 7/2006 | Thorne et al. | |
| 7,088,639 B2 | 8/2006 | Walls et al. | |
| 7,089,166 B2 | 8/2006 | Malthe-Sorenssen et al. | |
| 7,111,681 B2 | 9/2006 | Detournay et al. | |
| 7,124,030 B2 | 10/2006 | Ellis | |
| 7,174,254 B2 | 2/2007 | Ellis | |
| 7,188,058 B2 | 3/2007 | Hardy et al. | |
| 7,188,092 B2 | 3/2007 | Wentland et al. | |
| 7,200,533 B2 | 4/2007 | Hu et al. | |
| 7,210,342 B1 | 5/2007 | Sterner et | |
| 7,224,162 B2 | 5/2007 | Proett et al. | |
| 7,225,078 B2 | 5/2007 | Shelley et al. | |
| 7,242,637 B2 | 7/2007 | Van Den Beukel et al. | |
| 7,248,259 B2 | 7/2007 | Fremming | |
| 7,248,539 B2 | 7/2007 | Borgos et al. | |
| 7,249,009 B2 | 7/2007 | Ferworn et al. | |
| 7,251,566 B2 | 7/2007 | Wu et al. | |
| 7,254,091 B1 | 8/2007 | Gunning et al. | |
| 7,257,490 B2 | 8/2007 | Georgi et al. | |
| 7,263,443 B2 | 8/2007 | Clavaud | |
| 7,266,041 B1 | 9/2007 | Padgett | |
| 7,273,097 B2 | 9/2007 | Fox et al. | |
| 7,277,796 B2 | 10/2007 | Kuchuk et al. | |
| 7,282,704 B2 | 10/2007 | Guo | |
| 7,286,939 B2 | 10/2007 | Bachrach et al. | |
| 7,297,661 B2 | 11/2007 | Beyer et al. | |
| 7,309,983 B2 | 12/2007 | Freedman | |
| 7,310,579 B2 | 12/2007 | Ricard et al. | |
| 7,328,107 B2 | 2/2008 | Strack et al. | |
| 7,337,660 B2 | 3/2008 | Ibrahim et al. | |
| 7,344,889 B2 | 3/2008 | Kelemen et al. | |
| 7,356,413 B2 | 4/2008 | Georgi et al. | |
| 7,363,158 B2 | 4/2008 | Stelting et al. | |
| 7,363,161 B2 | 4/2008 | Georgi et al. | |
| 7,366,616 B2 | 4/2008 | Bennett et al. | |
| 7,377,318 B2 | 5/2008 | Detournay et al. | |
| 7,387,021 B2 | 6/2008 | DiFoggio | |
| 7,395,691 B2 | 7/2008 | Sterner et al. | |
| 7,400,978 B2 | 7/2008 | Langlais et al. | |
| 7,424,415 B2 | 9/2008 | Vassilev | |
| 7,430,501 B2 | 9/2008 | Feraille et al. | |
| 7,478,024 B2 | 1/2009 | Gurpinar et al. | |
| 7,511,813 B2 | 3/2009 | Vannuffelen et al. | |
| 7,512,529 B2 | 3/2009 | Neave | |
| 7,516,056 B2 | 4/2009 | Wallis et al. | |
| 7,520,158 B2 | 4/2009 | DiFoggio | |
| 7,523,024 B2 | 4/2009 | Endres et al. | |
| 7,526,418 B2 | 4/2009 | Pita et al. | |
| 7,529,626 B1 | 5/2009 | Ellis | |
| 7,542,037 B2 | 6/2009 | Fremming | |
| 7,548,873 B2 | 6/2009 | Veeningen et al. | |
| 7,561,997 B1* | 7/2009 | Miller | 703/10 |
| 7,571,644 B2 | 8/2009 | Ibrahim et al. | |
| 7,596,480 B2 | 9/2009 | Fung et al. | |
| 7,596,481 B2 | 9/2009 | Zamora et al. | |
| 7,603,265 B2 | 10/2009 | Mainguy et al. | |
| 7,617,082 B2 | 11/2009 | Childs et al. | |
| 7,617,083 B2 | 11/2009 | Bennis et al. | |
| 7,630,914 B2 | 12/2009 | Veeningen et al. | |
| 7,664,624 B2 | 2/2010 | Michel et al. | |
| 7,687,769 B2 | 3/2010 | Indo et al. | |
| 7,720,658 B2 | 5/2010 | Ricard et al. | |
| 7,739,089 B2 | 6/2010 | Gurpinar et al. | |
| 7,742,875 B2 | 6/2010 | Li et al. | |
| 7,752,022 B2 | 7/2010 | Fornel et al. | |
| 7,756,694 B2 | 7/2010 | Graf et al. | |
| 7,762,131 B2 | 7/2010 | Ibrahim et al. | |
| 7,764,573 B2 | 7/2010 | Devi | |
| 7,788,074 B2 | 8/2010 | Scheidt et al. | |
| 7,835,893 B2 | 11/2010 | Cullick et al. | |
| 7,899,657 B2 | 3/2011 | Martin | |
| 7,913,190 B2 | 3/2011 | Grimaud et al. | |
| 7,953,585 B2 | 5/2011 | Gurpinar et al. | |
| 2002/0013687 A1 | 1/2002 | Ortoleva | |
| 2002/0049575 A1 | 4/2002 | Jalali et al. | |
| 2002/0067373 A1 | 6/2002 | Roe et al. | |
| 2002/0120429 A1 | 8/2002 | Ortoleva | |
| 2003/0205083 A1* | 11/2003 | Tubel et al. | 73/152.19 |
| 2005/0199391 A1 | 9/2005 | Cudmore et al. | |
| 2006/0014647 A1 | 1/2006 | Beyer et al. | |
| 2006/0041409 A1 | 2/2006 | Strebelle et al. | |
| 2006/0153005 A1 | 7/2006 | Herwanger et al. | |
| 2006/0235668 A1 | 10/2006 | Swanson et al. | |
| 2007/0011646 A1 | 1/2007 | Chrisochoides et al. | |
| 2007/0016389 A1 | 1/2007 | Ozgen | |
| 2007/0118292 A1 | 5/2007 | Moos | |
| 2007/0162235 A1 | 7/2007 | Zhan et al. | |
| 2007/0219725 A1 | 9/2007 | Sun et al. | |
| 2007/0265778 A1 | 11/2007 | Suter et al. | |
| 2008/0004847 A1 | 1/2008 | Bradford | |
| 2008/0040086 A1 | 2/2008 | Betancourt et al. | |
| 2008/0059140 A1 | 3/2008 | Salmon et al. | |
| 2008/0065362 A1 | 3/2008 | Lee et al. | |
| 2008/0147326 A1 | 6/2008 | Ellis et al. | |
| 2008/0208476 A1 | 8/2008 | Karami | |
| 2009/0071239 A1 | 3/2009 | Rojas et al. | |
| 2009/0271233 A1* | 10/2009 | Prange et al. | 705/7 |
| 2011/0290478 A1* | 12/2011 | Sun et al. | 166/250.01 |

FOREIGN PATENT DOCUMENTS

| | | |
|---|---|---|
| WO | WO 2007/063442 | 6/2007 |
| WO | WO 2008/100614 | 8/2008 |
| WO | WO 2009/094064 | 7/2009 |
| WO | WO 2010/008647 | 1/2010 |

OTHER PUBLICATIONS

Ainsworth, R.B. (2005), "Sequence Stratigraphic-Based Analysis of Depositional Architecture—A Case Study From a Marginal Marine Depositional Setting," *Petroleum Geoscience* 11, pp. 257-276.

Allen, J.R.L. (1978), "Studies in Fluviatile Sedimentation; An Exploratory Quantitative Model for the Architecture of Avulsion-Controlled Alluvial Sites," *Sedimentary Geology* 21(2), pp. 129-147.

(56) References Cited

OTHER PUBLICATIONS

Barton, M., et al. (2004), "Understanding Hydrocarbon Recovery in Deepwater Reservoirs; Modeling Outcrop Data in the Third Dimension," *AAPG* 13, pp. 11.

Bradley, D.A. et al. (1968), "Improving Prudhoe Bay Pulse-Test Data by Processing with Fourier Transforms," SPE 18124, 1968 SPE Annual Tech. Conf. and Exh., Oct. 2-5, 1968, 14 pgs.

Chorneyko, D.M. (2006), "Real-Time Reservoir Surveillance Utilizing Permanent Downhole Pressures—An Operator's Experience," SPE 103213, 2006 SPE Annual,Tech. Conf. and Exh., Sep. 24-27, 2006.

Cooley, J.W. et al. (1965), "An algorithm for the machine calculation of complex Fourier series," *Math. Comput.* 19, pp. 297-301.

Clarke, S.M. et al. (2005), "A three-dimensional approach to fault seal analysis: fault-block juxtaposition & argillaceous smear modelling," XP-002552738, *Basin Research* 17, pp. 269-288.

Crawford, B.R.(2002), "Porosity-permeability Relationships to Clay-bearing Fault Gouge," SPE/ISRM 7812, SPE/ISRM Rock Mechanics Conf., 13 pgs.

Ehrlich, R. et al. (2006), "Quantification and sensitivity of fault seal parameters demonstrated in an integrated reservoir modelling work flow," XP009124858, pp. 52-55.

Elshahawi, H. et al. (2000), "Correcting for Wettability and Capillary Pressure Effects on Formation Tester," Oct. 1-4, 2000, SPE 63075, 15 pgs.

Firoozabadi, A. (1998), "Surface Tension of Water-Hydrocarbon Systems At Reservoir Conditions, "*J. of Canadian Petroleum Technology, Reservoir Engineering* 41, 8 pgs.

Fisher, Q.J. et al. (2001), "The permeability of faults within siliciclastic petroleum reservoirs of the North Sea and Norwegian Continental Shelf," *Marine and Petroleum Geology* 18, pp. 1063-1081.

Gainski, M. et al. (2008), "The Schiehallion Field: Detection of Reservoir Compartmentalisation and Identification of New Infill Targets Using 4D Seismic Surveys and Dynamic Production Data, Reservoir Compartmentalization [Online]," Mar. 5-6, 2008, pp. 32. Retrieved from the Internet: URL:http//www.geolsoc.org.uk/webdav/site/GSL/shared/pdfs/events/abstracts/ReservoirAbstractBook.pdf, pp. 32.

Hollaender, F. et al. (2002), Harmonic Testing for Continuous Well and Reservoir Monitoring, SPE 77692, 2002 SPE Annual Tech. Conf. and Exh, Sep. 29-Oct. 2, 2002, 12 pgs.

James, W.R. (2004), "Fault-Seal Analysis Using a Stochastic Multi-Fault Approach," pp. 885.

Jansen, F.E. et al. (1997), "Application of Wavelets to Production Data in Describing Inter-Well Relationships," SPE 38876, 1997 SPE Annual Tech. Conf. and Exh., Oct. 5-8, 1997, 8 pgs.

Justwan, H. et al. (2008), "Characterization of Static and Dynamic Reservoir Connectivity for the Ringhorne Field, Through Integration of Geochemical and Engineering Data," Reservoir Compartmentalization, 1pg.

Justwan, H.K. et al. (2008), "Unraveling Dynamic Fluid Connectivity Through Time-Lapse Geochemistry—From Example From the Ringhorne Field," AAPG Int'l Conf and Exhibition, 1 pg.

King, P.R. (1990), "The Connectivity and Conductivity of Overlapping Sand Bodies," *North Sea Oil and Gas Reservoirs-II*, pp. 353-362.

Larue, D.K. et al. (2006), "Connectivity of Channelized Reservoirs: A Modeling Approach," *Petroleum Geoscience* 12, pp. 291-308.

Lescoffit, G. et al. (2005), "Quantifying the Impact of Fault Modeling Parameters on Production Forecasting for Clastic Reservoirs," *AAPG Hedberg Series* 2, pp. 137-149.

McCain, W.D., Jr. (1991), Reservoir-Fluid Property Correlations—State of the Art, *SPERE*, pp. 266.

Manzocchi, T., et al. (2008), "Sensitivity of the Impact of Geological Uncertainty on Production From Faulted and Unfaulted Shallow-Marine Oil Reservoirs: Objectives and Methods," *Petroleum Geoscience* 14, pp. 3-15.

Manzocchi, T. et al. (1999), "Fault transmissibility multipliers for flow simulation models," *Petroleum Geoscience* 5, pp. 53-63.

Olsen, S. et al. (2005), "Automatic Filtering and Monitoring of Real-Time Reservoir and Production Data," SPE 96553, 2005 SPE Annual Tech. Conf. and Exh., Oct. 9-12, 2005, 12 pgs.

Rai, H. (2005), "Analyzing Rate Data from Permanent Downhole Gauges," Report submitted to Dept. of Petroleum Engineering, Stanford University, 70 pgs.

Richards, B., et al. (2008), "Reservoir Connectivity Analysis of a Complex Combination Trap Terra Nova Field, Jeanne d'Arc Basin, Newfoundland, Canada," *Reservoir Compartmentalization*, pp. 333-355.

Sales, J.K. (1997), "Seal Strength Vs. Trap Closure; A Fundamental Control on the Distribution of Oil and Gas, in: Seals, Traps, and the Petroleum System," *AAPG* 67, pp. 57-83.

Schlumberger (2004), "Managing Uncertainty in Oilfield Reserves," Middle East Well Evaluation Review, 12 pgs.

Snedden, J.W. et al. (2007), "Reservoir Connectivity: Definitions, Examples and Strategies," IPTC 11375, 6 pgs.

Snedden, J.W. et al. (1988), "Storm and Fairweather Combined-Flow on the Central Texas Continental Shelf," *Jour. Sm. Pet.* 58, pp. 580-595.

Sumpter, L., et al. (2008), "Early Recognition of Potential Reservoir Compartmentalization," *Reservoir Compartmentalization*, Mar. 5-6, 2008, p. 84.

Sweet, M.L. et al. (2007), "Genesis Field, Gulf of Mexico: Recognizing Reservoir Compartments on Geologic and Production Timescales in Deep-Water Reservoirs," *AAPG* 91, pp. 1701-1729.

Vrolijk, P.J. et al. (2005), "Reservoir Connectivity Analysis—Defining Reservoir Connections and Plumbing," 2005, SPE 93577, 23 pgs.

Yielding, G. et al. (1997), "Quantitative Fault Seal Prediction," *AAPG Bulletin* 81(6), pp. 897-917.

*EP Search Report*, dated Nov. 18, 2009, EP 09 15 9528.

*International Search Report & Written Opinion*, dated Jan. 28, 2010, PCT/US2009/066607.

Yielding, G. (2002), "Shale Gouge Ratio—Calibration By Geophistory", *Hydrocarbon Seal Quantification, Special Publication*, 11, pp. 1-15.

\* cited by examiner

METHOD FOR PREDICTING FLUID FLOW

CROSS-REFERENCE TO RELATED APPLICATION

This application is the National Stage of International Application No. PCT/US2009/066607, that published as WO 2010/104535, filed 3 Dec. 2009, which claims the benefit of U.S. Provisional Application No. 61/160,143, filed 13 Mar. 2009 and U.S. Provisional Application No. 61/176,735, filed 8 May 2009, each of which is incorporated herein by reference, in its entirety, for all purposes.

TECHNICAL FIELD

The invention relates to a method for predicting fluid flow by evaluating connections and fault characteristics in a subsurface environment.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section should be read in this light, and not necessarily as admissions of prior art.

Faults in sandstone-shale sequences have the potential to diminish cross-fault gas, oil and water flow by diminishing the cross-sectional reservoir area available for flow and by introducing a layer of low permeability fault zone materials distributed along a fault. When fault juxtaposition areas are small and fault zone materials distributed across the area of reservoir contact have low permeability, faults have the potential to create a really limited compartments of gas and oil that diminish the productive capacity of wells.

Fault zone materials develop low permeability through the fault processes of cataclasis, shale smear and cementation. Cataclasis operates on the porous and permeable part of the stratigraphy (sandstone) by breaking, fragmenting, and crushing detrital sand grains, reducing the mean size of grains and, importantly, the size of pores between the grains. In some instances, the permeability effects of cataclasis are augmented by cementation and annealing of the broken fragments, further reducing pore sizes. Shale smear, on the other hand, decreases the permeability of the aggregate fault zone by introducing the low permeability component of the stratigraphy (shale).

With respect to predicting fluid flow in a subsurface region, the current practice is to evaluate the effects of fault zone materials on cross-fault flow by calculating some variation on a Shale Gouge Ratio (SGR) or Clay Smear Potential (CSP). These measures both represent properties that are essentially proportional to the shale fraction of the sedimentary section faulted past every point along the fault. SGR and CSP values are converted to gouge or gauge permeability based on empirically defined log-linear relations between SGR and CSP and measured permeability from faults sampled in cores or outcrops.

The current practice is limited in two respects: predictive capability and robustness. With respect to predictive capability, most approaches require local calibration of SGR to fault permeability, limiting utility of the approach early in development when estimates of reservoir compartmentalization are most acute. With respect to robustness, known practices fail to account for the absence of the impact of fault zone materials on cross-fault flow in some settings where the volume of sand (net) is relatively small compared to the total rock volume (gross) (low net:gross (N:G) sections). Known practices also fail to take into consideration the apparent low permeability of faults in some high N:G sections. An improved method of evaluating the impact of the presence and composition of fault zone materials on reservoir fluid flow is desirable.

SUMMARY OF THE INVENTION

An exemplary embodiment of the present techniques comprises a method for correlating predicting fluid flow. Data describing a stratigraphy is obtained. The stratigraphy comprises a fault. A volume of shale in the fault is predicted and a thickness of the fault is calculated. A permeability of the fault is calculated based on the volume of shale, the thickness, an estimated shale smear continuity factor and an estimated cataclastic reduction factor. Fluid flow is predicted in a subsurface region based on the fault permeability.

The shale smear continuity factor may comprise a range and/or a probability. The cataclastic reduction factor may comprise a range and/or a probability. A transmissibility multiplier may be calculated based on the fault permeability. The fault permeability may be transformed into a visual representation of the subsurface region. The visual representation may comprise a chart and/or a map. Data corresponding to the fault permeability may be filtered based on a minimum desired value or a maximum desired value. The data describing the stratigraphy may comprise one-dimensional data, two-dimensional data or three-dimensional data.

Another exemplary embodiment of the present techniques comprises a method for producing hydrocarbons from an oil and/or gas field. The method comprises obtaining data describing a stratigraphy, the stratigraphy comprising a fault. The method for producing hydrocarbons additionally comprises predicting a volume of shale in the fault and calculating a thickness of the fault. A permeability of the fault is calculated based on the volume of shale, the thickness, an estimated shale smear continuity factor and an estimated cataclastic reduction factor. Fluid flow in a subsurface region is predicted based on the fault permeability. Hydrocarbons are extracted from the oil and/or gas field using the predicted fluid flow.

In a method of producing hydrocarbons according to the present techniques, the shale smear continuity factor may comprise a range and/or a probability. The cataclastic reduction factor may comprise a range and/or a probability. A quality control check may be performed to determine whether the fault permeability is within an acceptable range. The fault permeability may be transformed into a visual representation of the subsurface region. The visual representation may comprise a chart and/or a map. The data describing the stratigraphy may comprise one-dimensional data, two-dimensional data or three-dimensional data.

Another exemplary embodiment of the present techniques comprises a computer system that is adapted to predict fluid flow. The computer system comprises a processor. The computer system also comprises a tangible, machine-readable storage medium that stores tangible, machine-readable instructions for execution by the processor. The tangible, machine-readable instructions comprise code that is adapted to obtain data describing a stratigraphy, the stratigraphy comprising a fault, and code adapted to predict a volume of shale in the fault. The tangible, machine-readable instructions also comprise code adapted to calculate a thickness of the fault and code adapted to calculate a permeability of the fault based on the volume of shale, the thickness, an estimated shale smear continuity factor and an estimated cataclastic reduction factor. In addition, the tangible, machine-readable instructions comprise code adapted to predict fluid flow in a subsurface region based on the fault permeability.

DESCRIPTION OF THE DRAWINGS

Advantages of the invention may become apparent upon reviewing the following detailed description and drawings of non-limiting examples of embodiments in which.

DETAILED DESCRIPTION OF THE INVENTION

Figure 1:
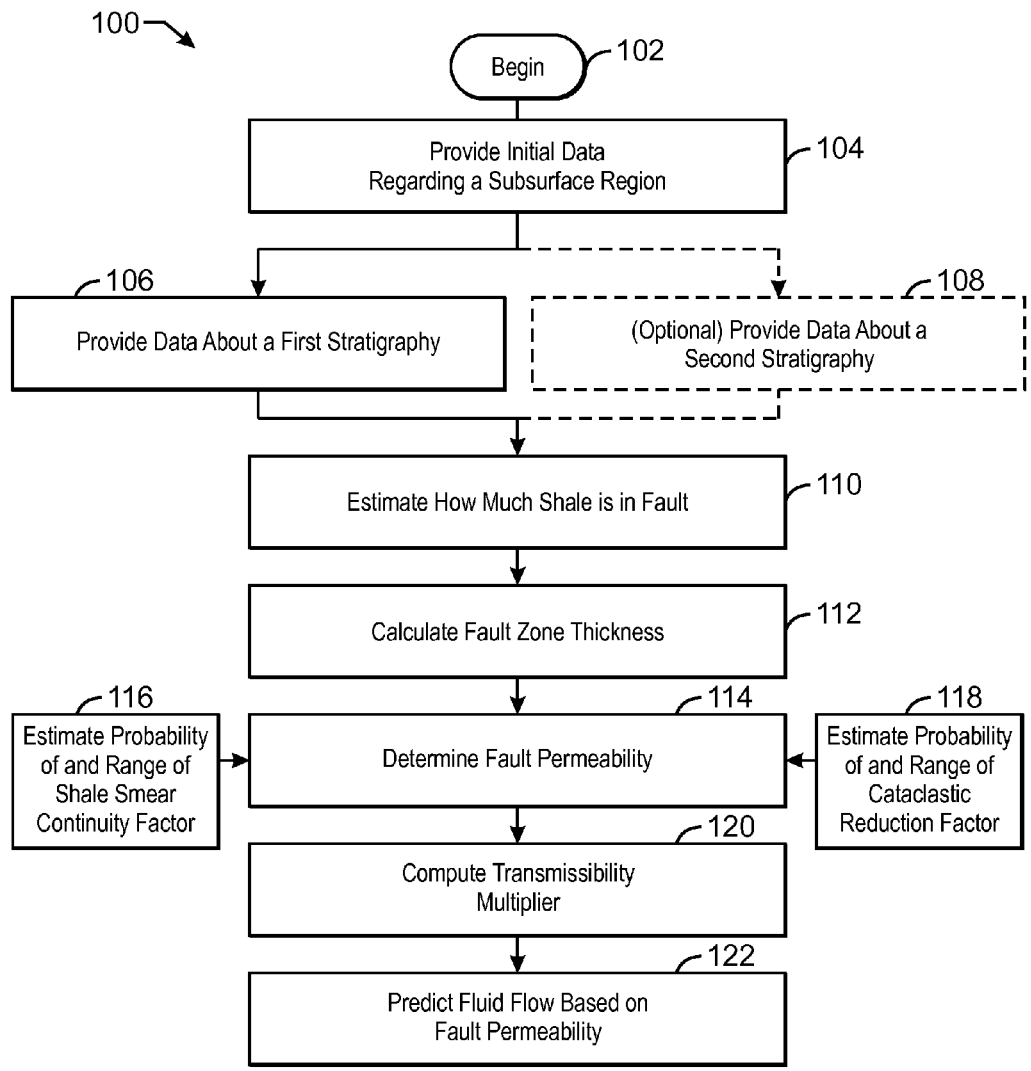
FIG. 1 is a process flow diagram showing a method for evaluating connections and fault characteristics using one-dimensional data.

In the following detailed description section, embodiments are described in connection with preferred embodiments. However, to the extent that the following description is specific to a particular embodiment or a particular use, this is intended to be for exemplary purposes only and simply provides a description of exemplary embodiments. Accordingly, the invention is not limited to the specific embodiments described below, but rather, it includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "basin model" refers to a simplification of the earth and its processes with the intent being to track the dynamic evolution of one or more of those processes through time. For example, the processes related to the generation and migration of hydrocarbons is commonly modeled with the intent to determine which of several possible structural culminations may be the most prospective for containing a commercial accumulation. Basin models use data from seismic, well control and knowledge of the geology of the area to construct a numerical model of the region and to track the changes in the various modeled parameters through time to reach a set of predictions that are then calibrated to the known information at the present. The model parameters are then adjusted within geologically reasonable bounds until a successful match and calibration is reached. Prediction can then be made at locations away from the calibration points.

As used herein, the term "cataclasis" refers to a deformation of rock caused by breakage and rotation of aggregates such as sand or mineral grains.

As used herein, the term "centerline fault" refers to a fault trace on a map where the line representing the fault is drawn along the center of the fault gap delimited by the foot wall and hanging wall cutoffs. Each point on the fault centerline is associated with a fault throw.

As used herein, the term "connectivity" refers to a measure of the communication (or lack thereof) between points within a geologic zone. Connectivity is closely related to the reservoir internal geometry and is commonly a primary factor controlling hydrocarbon production efficiency and ultimate recovery.

As used herein, the term "earth model" refers to a geologic model of a portion of the earth that may also contain material properties.

As used herein, the term "fault" refers to a shear displacement of rocks along a planar discontinuity, and "fault zone" refers to the zone of complex deformation associated with a fault.

As used herein, the term "fault juxtaposition area" refers to a region in which permeable materials constituting flow units exist on either side of a fault and are juxtaposed one against the other across the fault due to displacement along the fault surface.

As used herein, the term "fault throw" refers to a vertical displacement between two originally adjacent points on either side of a fault zone that have been offset by the fault.

As used herein, the terms "fault zone materials" or "fault gouge" refer to particles of rock material that result from fault deformation processes, such as cataclasis and shale smear, that are present in a fault.

As used herein, the term "shale smear" refers to the process of dispersing fine-grained geologic materials, such as clay, in a fault.

As used herein, the term "tangible machine-readable medium" refers to a medium that participates in directly or indirectly providing signals, instructions and/or data to a processing system. A tangible machine-readable medium may take forms, including, but not limited to, non-volatile media (e.g., ROM, disk) and volatile media (RAM). Common forms of a machine-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

As used herein, the term "transmissibility multiplier" refers to a measure of the effect of the combined thickness and permeability of fault zone materials on across-fault flow in a portion of a subsurface region as represented in a cellular model.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. A procedure, step, logic block, process, or the like, is conceived and understood herein to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that discussions herein using terms such as "processing", "computing", "calculating", "determining", "predicting" or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, various actions could occur concurrently, substantially in parallel, and/or at substantially different points in time.

As set forth below, it may be possible to analyze the effect of faults and fault zone materials on fluid flow in a subsurface environment when data in one, two or three dimensions is available. Those of ordinary skill in the art will appreciate that it may be desirable to analyze the effect of fault zone materials on fluid flow. Such analysis may be useful in increasing the production of hydrocarbons from underground reservoirs or regions.

FIG. 1 is a process flow diagram showing a method for evaluating connections and fault characteristics using one-dimensional data. The method is generally referred to by the reference number 100. In particular, the method 100 relates to determining a range of fault permeabilities for a range of fault throws with a fault permeability prediction tool/module as described herein. At block 102, the process begins.

At block 104, basic input is provided regarding the subsurface environment that is to be analyzed. This input may include selecting a type and number of wells to evaluate, selecting data regarding various well performance criteria, selecting sand/shale cutoff data, or the like. Alternatively, the input may be designated by manually entering a predetermined data/model which automatically incorporates the input for the process 100.

At block 106, data regarding a first stratigraphy within the subsurface region is provided. A user may manipulate a separate set of data to group intervals based on common lithology types, e.g., volume of sand, volume of shale (Vsh), or the like. In addition, stratigraphic data may be provided, for example, by editing well data provided at block 104. In addition, surfaces with lateral extent that represent a single rock layer or horizon may be blocked, added, replaced or removed. Data representing other stratigraphies may be optionally provided, as indicated at block 108. Block 108 is shown in dashed lines to indicate the optional nature of the data about additional stratigraphies.

An estimate regarding an amount of shale contained in a fault is made, as indicated at block 110. In one exemplary embodiment, the process of estimating and/or calculating the shale contained in the fault is referred to as a displaced section analysis or DSA. The output of a DSA, termed a DSA value, represents the percent of shale in a fault zone. The term "value" refers to a numerical representation that remains constant in a predictive model according to the present techniques. The DSA value may be determined using a depth range to provide an upper and lower bounds calculation. A range of fault throws may be selected to control the total fault throw in the calculation. A range of throw intervals may be selected for plotting purposes and to control the offset in each calculation at the predetermined intervals. Results may be displayed on a chart where the vertical axis is throw. Specifying the throw interval controls the vertical resolution of the plot. Specifying the total throw also controls the resolution, but indirectly, as the total throw is typically divided by the plot scale, which yields a certain throw interval. DSA may be determined by offsetting the input data against itself by the range of fault throws and calculating a resultant DSA value. The DSA values may be displayed in table form. DSA values may also be displayed in chart form and may be stored in memory for later evaluation.

Alternatively, the DSA value may be calculated by offsetting the input stratigraphy for two different wells or two different expected stratigraphies against each other. In so doing, a depth range may be selected to provide an upper and lower bounds calculation. A range of fault throws may be selected as input to control the total offset in the calculation. In addition, a range of throw intervals may be selected for plotting purposes and to control the offset in each calculation at the predetermined intervals. The calculated DSA values are displayed in table form. Alternatively, the calculated DSA values can be displayed in chart form.

At block 112, the thickness of the fault zone being evaluated is calculated. To calculate fault zone thickness, maximum and minimum range data is provided for values which represent the constants used in an equation for determining fault thickness versus the amount the fault has slipped. For example, slip values are assumed to be equal to the selected range of fault throws discussed above with respect to block 110. A value for an exponent that limits the maximum and minimum fault zone thickness may be provided. The calculation of fault zone thickness may be executed as a deterministic process or alternatively using a stochastic method. The calculation may be performed by offsetting the input data against itself by the range of fault throws discussed above with respect to block 110. A resultant fault thickness for each throw value may be determined. The calculated fault thickness values may be displayed as a table of data. Alternatively, these values may be displayed as a chart.

As shown in FIG. 1, fault permeability is determined at block 114. An exemplary fault permeability equation is set forth below:

$$k_f = (Fvsh * ksh^{(1-2Cf)} + (1-Fvsh) * (kss * kcat)^{(1-2Cf)})^{-(1-2Cf)} \quad (1)$$

where, $k_f$ represents the permeability of composite fault zone material at point of interest, Fvsh represents volume of shale in the fault at point of interest (e.g., DSA value), ksh represents permeability of the shale-based fault zone material, kss represents the permeability of sand-based fault zone material, kcat represents the cataclastic reduction factor and Cf represents a shale smear continuity factor. Those of ordinary skill in the art will appreciate that different fault permeability equations may be developed, depending on characteristics of a fault being evaluated and data available about the fault being evaluated. The use of a particular fault permeability equation is not a requirement of the present invention.

The determination of fault permeability employs a shale smear continuity factor, which is estimated at block 116. In particular, the probability and range of the shale smear continuity factor are estimated at block 116. The shale smear continuity factor, which has a minimum value of 0 and a maximum value of 1, takes into account the effect on permeability of the distribution of shale smear in the fault zone being evaluated. A shale smear continuity factor of 1 corresponds to a distribution of solid shale in the fault and a shale smear continuity factor of 0 corresponds to a complete lack of shale smear continuity in the fault zone. The shale smear continuity factor, once determined, may be represented in a fault permeability equation by a continuity factor variable, such as Cf in Equation 1.

Also used in determining the fault permeability is a cataclastic reduction factor, which is estimated at block 118. In particular, the probability and range of the cataclastic reduction factor are estimated at block 118. The cataclastic reduction factor, which has minimum value of 0 and a maximum value of 1, takes into account the effect on permeability of cataclastic fault zone material within the fault being evaluated. A cataclastic reduction factor of 0 corresponds to a complete lack of permeability in the fault zone because of cataclastic material and a cataclastic reduction factor of 1 corresponds to a complete absence of cataclastic material in the fault zone. The cataclastic reduction factor may be represented in the fault permeability equation by a cataclastic reduction factor variable, shown as kcat in Equation 1. The calculated fault permeability values may be displayed as a table of data. Alternatively, these values may be displayed as a chart.

At block 120, a transmissibility multiplier is computed based on the fault permeability determined at block 114. An exemplary fault transmissibility equation is set forth below:

$$Tmult = [1 + L_f * (2/k_f - 1/k_1 - 1/k_2)/(L_1/k_1 + L_2/k_2)]^{-1} \quad (2)$$

where $k_f$ is the permeability of the fault materials and $L_f$ is their thickness, $k_1$, $k_2$, $L_1$ and $L_2$ are the permeability and length of across-fault juxtaposed sands. The length parameters ($L_1$ and $L_2$) may represent a cell dimension from a geologic earth model or a flow simulation model. Because it employs the fault zone permeability, the transmissibility multiplier also represents data such as the DSA, the fault zone thickness, the shale smear continuity and cataclastic reduction. In addition, a cutoff value may be provided to discriminate between rock units that act as flow carriers and those that act as flow barriers. The calculation to determine the transmissibility multiplier may be performed on a single stratigraphic model by displacing the model by a range of fault throws, calculating a resultant fault permeability for each throw value, then using these values to calculate a resultant transmissibility multiplier for each throw value. The calculated transmissibility multiplier values may be displayed as a table of data. Alternatively, these values may be displayed as a chart.

The transmissibility multiplier may be used to predict fluid flow within the subsurface region being evaluated, as shown at block 122. Moreover, the transmissibility multiplier represents the impact on fault permeability of fault zone materials within the fault zone. This means that the transmissibility multiplier embodies data related to the impact of faults on connectivity within the subsurface region being evaluated.

The transmissibility multiplier may be provided in the form of an output plot that may be used to evaluate a range of fault throws that results in fault permeability values. Moreover, the transmissibility multiplier may be calculated and displayed in table form to show restrictions in cross flow for one or more one-dimensional stratigraphic sections.

Figure 2:
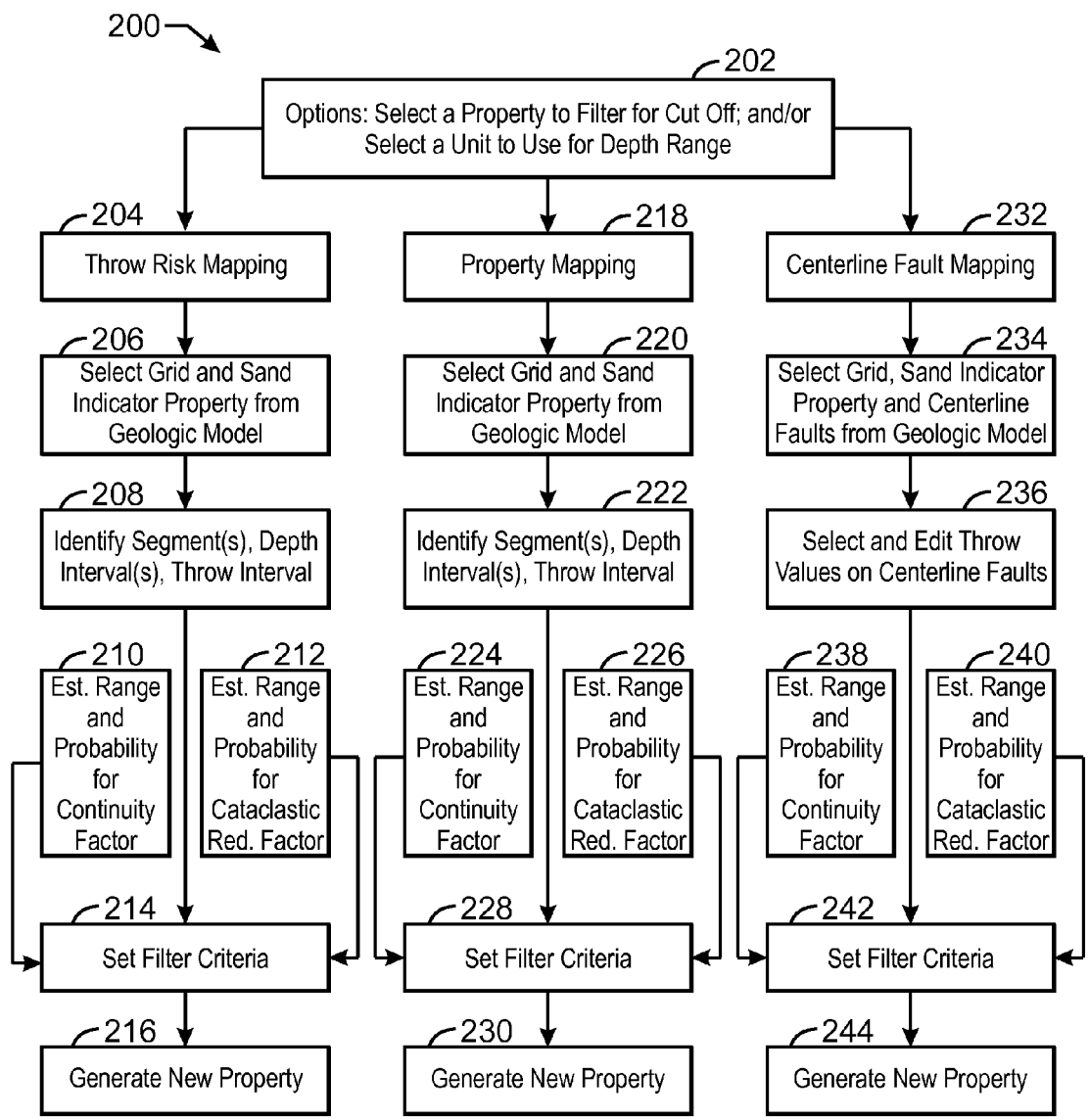
FIG. 2 is a process flow diagram showing a method for evaluating connections and fault characteristics using two-dimensional data.

FIG. 2 is a process flow diagram showing a method for evaluating connections and fault characteristics using two-dimensional data. The process is generally referred to by reference number 200. Process 200 relates to determining a range of fault zone material characteristic properties for a range of fault throws associated with a plurality of cells in an earth model with a fault permeability prediction tool/module as described herein.

At block 202, a plurality of initial options are selected, which may include a cut-off property to filter results, such as a target transmissibility value to distinguish which fault properties would allow faults to act as flow barriers verses flow baffles, a unit to use for depth range, or the like. The term "property" refers to a numerical representation that can vary throughout a predictive model according to the present techniques. As described herein, three types of properties may be evaluated using two-dimensional data: throw risk mapping, property mapping and centerline throw mapping. A throw risk map shows the magnitude of throw at any given location that would result in a specified fault permeability or transmissibility multiplier. Property maps show the magnitude of a fault property, with specified throw, at any given location, such as predicted shale volume or the remaining fraction of juxtaposed sands. Centerline fault mapping creates similar properties but restricted to each point along a mapped centerline fault, rather than everywhere in the map domain. In the exemplary embodiment shown in FIG. 2, the throw risk mapping process starts at block 204 and continues down the left column of FIG. 2. The property mapping process begins at block 218 and continues down the center column of FIG. 2. The centerline fault mapping process begins at block 232 and continues down the right column of FIG. 2.

The throw risk mapping process 204 relates to a fault zone property for a plurality of columns of vertically connected cells located in I-J space. I-J space is the local horizontal reference frame for a geo-cellular model which has specified integer coordinates (i,j,k) for consecutive cells, where k is a vertical coordinate. Examples of fault zone properties that may be evaluated using the throw risk mapping process 204 include juxtaposition fraction, DSA, fault zone permeability, a transmissibility multiplier or the like. As used herein, juxtaposition fraction refers to the remaining fraction of sand-to-sand juxtaposition at some throw amount relative to original unfaulted juxtaposed sands. The throw risk mapping process 204 may be used to evaluate a sequential and iterative offset of columns of vertically connected cells for a plurality of fault throws that results in a plurality of values corresponding to multiple distinct fault zone materials. Properties of the distinct fault zone materials such as the amount of shale smear in the fault or the cataclastic permeability reduction may be calculated and displayed in map form. In an exemplary embodiment, only data for properties that exceed a preselected cutoff value are displayed. When a user-defined cutoff value is reached at a particular throw value, the average throw value for a column of cells is posted on the map at the location of the top cell of the selected horizon.

The distinct fault zone properties described above may be calculated and displayed in map form. In an exemplary embodiment, only data for properties that exceed a preselected cutoff value are displayed. When the preselected cutoff value is reached, the average property value for the column of cells is posted on the map at the location of the top cell of the selected horizon.

At block 206, data relating to a grid and a sand indicator property are selected from a geologic model. The grid may represent an earth model. The sand indicator property may be associated with the earth model. Segments of the earth model to analyze are selected for evaluation, as shown at block 208. Data relating to depth intervals and throw intervals may also be selected at this point. Those of ordinary skill in the art will appreciate that k levels in i, j space may be used in place of depth levels, where k levels represent values perpendicular to the i-j plane in i, j space. The throw interval is used to offset cells of the grid by the specified throw in a stepwise fashion.

A user may choose a specific fault zone property to evaluate. For example, fault zone properties may be chosen from a pull-down list or menu. For specific fault zone properties, additional data entry may be needed. For example, if the fault zone property of interest is fault permeability, additional data that may be needed includes a Vsh property associated with each grid of the earth model that will be analyzed. A permeability property associated with each grid may also be selected. A range and probability for a shale smear continuity factor are estimated, as shown at block 210. A range and probability for a cataclastic reduction factor are estimated, as shown at block 212.

If a transmissibility multiplier is the fault zone property chosen for evaluation, additional data relevant to the computation of the transmissibility multiplier may be provided by a user. In particular, a Vsh property associated with the grid in the earth model may be selected or provided. A permeability property associated with each grid may also be selected or provided. A range and probability for a shale smear continuity factor are estimated, as shown at block 210. A range and probability for a cataclastic reduction factor are estimated, as shown at block 212. A value for a cell length corresponding to a value that might be used in a reservoir simulation may also be provided.

After relevant data corresponding to a fault parameter of interest has been provided, filter criteria are chosen, as shown at block 214. The filter criteria may include an output property calculation process, various filter input parameters, a property test values calculation, and a property name, to name just a few examples. The filter criteria are used to test whether calculated data for a fault property of interest are within a specific range. This may be done using a Boolean operator "greater than" or "less than" in conjunction with setting desired cutoff values. The new property of interest is then generated based on the input criteria, as shown at block 216. For example, if fault permeability is the property of interest, then equation 1 is used to generate a permeability from input data.

The throw risk mapping process 204 operates by offsetting each column of cells in the model by the designated throw interval and using the appropriate process to calculate the selected property value. The resultant value calculated for each offset is compared to the selection criteria. This process is repeated iteratively until the criteria are reached. A displacement value needed to satisfy the selection test for the column of cells is recorded for the grid cell and stored in the designated property. These values may be posted on a map at the location of the top cell of the selected interval.

Alternatively, a property object may be generated using the property mapping process 218. An exemplary property mapping process 218 may be used to evaluate the average value of a column of cells in the earth model based on selected input criteria for critical fault zone characteristics. Such property objects generated by this process may be displayed in map form.

At block 220, data relating to a grid and a sand indicator property are selected from a geologic model. The grid may represent an earth model. The sand indicator property may be associated with the earth model. Segments of the earth model to analyze are selected for evaluation, as shown at block 222. Data relating to depth intervals and throw intervals may also be selected at this point. Those of ordinary skill in the art will appreciate that k levels may be used in place of depth levels. The throw interval may be used to offset cells of the grid against each other by the throw interval in a stepwise fashion.

A user may choose a specific fault zone property to evaluate. For example, fault zone properties may be chosen from a pull-down list or menu. For specific fault zone properties, additional data entry may be needed. For example, if the fault zone property of interest is fault permeability, additional data that may be needed includes a Vsh property associated with each grid of the earth model that will be analyzed. A permeability property associated with each grid may also be selected. A range and probability for a shale smear continuity factor are estimated, as shown at block 224. A range and probability for a cataclastic reduction factor are estimated, as shown at block 226. The shale smear continuity factor and the cataclastic reduction factor may be determined as described above with respect to FIG. 1.

If a transmissibility multiplier is a fault zone property chosen for evaluation, additional data relevant to the computation of the transmissibility multiplier may be provided by a user. In particular, a volume of shale or Vsh property associated with the grid in the earth model may be selected. A permeability property associated with each grid may also be selected. A range and probability for a shale smear continuity factor are estimated, as shown at block 224. A range and probability for a cataclastic reduction factor are estimated, as shown at block 226. The shale smear continuity factor and the cataclastic reduction factor may be determined as described above with respect to FIG. 1. A value for a cell length corresponding to a value that might be used in a reservoir simulation may also be provided.

After relevant data corresponding to a fault parameter of interest have been provided, filter criteria are chosen, as shown at block 228. The filter criteria may include an output property calculation process, various filter input parameters, a property test values calculation, and a property name to name just a few examples. The filter criteria are used to test whether calculated data for a fault property of interest are within a specific range. This may be done using a Boolean operator "greater than" or "less than" in conjunction with setting desired cutoff values. The new property of interest is then generated based on the input criteria, as shown at block 230.

The property mapping process 218 operates by offsetting each column of cells in the earth model against itself by the designated throw interval. The appropriate process is applied to calculate the selected property. When the selection criteria are calculated, the average property value for the column of cells is recorded for the grid cell and stored in the designated property. These values may be posted on a map at the location of the top cell of the selected interval.

Alternatively, a property object may be generated using centerline fault mapping process 232. Centerline fault mapping process 232 may be used to evaluate the average value for critical fault zone characteristics for cells along fault centerlines in the earth model based on selected input criteria and fault throw values at the cell locations associated with selected faults. Such property objects generated by the centerline fault mapping process 232 may be displayed in map form.

At block 234, data relating to a grid and a sand indicator property are selected from a geologic model. The grid may represent an earth model. The sand indicator property may be associated with the earth model. As shown at block 236, a set of centerline faults is selected from the earth model input data as a line defined by points with x,y,z coordinates in space where the z-values of the centerline fault objects have been edited to represent fault throws rather than elevations or time. Throw values on centerline faults may be edited, if needed.

A user may choose a specific fault zone property to evaluate using the centerline fault mapping process 232. For example, fault zone properties may be chosen from a pull-down list or menu. For specific fault zone properties, additional data entry may be needed. For example, if the fault zone property of interest is fault permeability, additional data that may be needed includes a Vsh property associated with each grid of the earth model that will be analyzed. A permeability property associated with each grid may also be selected. A range and probability for a shale smear continuity factor are estimated, as shown at block 238. A range and probability for a cataclastic reduction factor are estimated, as shown at block 240.

As another example, the transmissibility multiplier may be the fault zone property chosen for evaluation. In such an event, additional data relevant to the computation of the transmissibility multiplier may be provided by a user. In particular, a volume of shale or Vsh property associated with the grid in the earth model may be selected. A permeability property associated with each grid may also be selected. A range and probability for a shale smear continuity factor are estimated, as shown at block 238. A range and probability for a cataclastic reduction factor are estimated, as shown at block 240. The shale smear continuity factor and the cataclastic reduction factor may be determined as described above with respect to FIG. 1. A value for a cell length corresponding to a value that might be used in a reservoir simulation may also be provided.

After relevant data corresponding to a fault parameter of interest has been provided, filter criteria are chosen, as shown at block 242. The filter criteria may include an output property calculation process, various filter input parameters, a property test values calculation, and a property name, to name just a few examples. The filter criteria are used to test whether calculated data for a fault property of interest are within a specific range. This may be done using a Boolean operator "greater than" or "less than" in conjunction with setting desired cutoff values. The new property of interest is then generated based on the input criteria, as shown at block 244.

Figure 3:
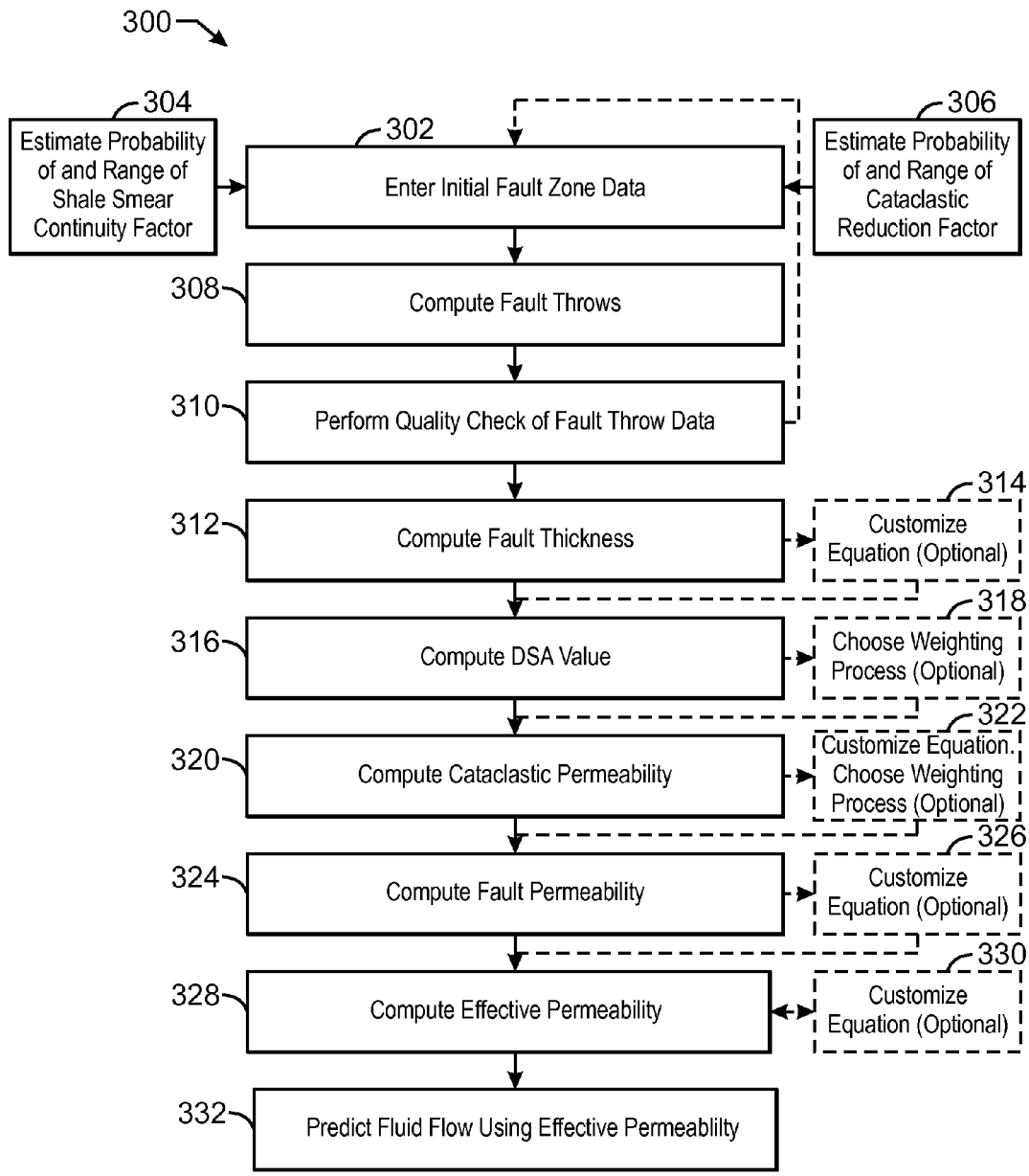
FIG. 3 is a process flow diagram showing a method for evaluating connections and fault characteristics using three-dimensional data.

FIG. 3 is a process flow diagram showing a method for evaluating connections and fault characteristics using three-dimensional data. The process is generally referred to by reference number 300. Moreover, process 300 may be used to determine a range of fault zone material properties for a selection of faults with variable throws from an earth model.

At block 302, initial data regarding a portion of a subsurface region to be evaluated is entered. Such initial data may be chosen from an earth model and may represent fault zones. The initial data may include a selection of a pillar grid and associated permeability properties. The initial data may include an estimate of a probability and range of a shale smear continuity factor, as shown at block 304, and an estimate of a probability and range of a cataclastic reduction factor, as shown at block 306. The initial data provided at block 302, 304 and 306 are used throughout the process 300. Those of ordinary skill in the art will appreciate that each successive block of process 300 relies on data and/or outputs determined in preceding blocks.

A user may manage a number of scenarios regarding the analysis of various fault zone parameters. For example, the user may add, remove or rename scenarios with meaningful names representative of input parameters. The user may select or deselect individual faults in the earth model to include or exclude from the calculations. The user may assign individual shale smear continuity factors or cataclastic reduction factors to one or more faults being evaluated.

At block 308, fault throw values for a fault zone being evaluated are computed. The output of the fault throw calculation shown at block 308 may be saved by creating a new property, updating an existing property, or bypassing the calculation to an additional property. The fault throw computation process 308 may be executed for all the faults in the earth model by selecting an input grid representing the earth model and selecting a property for the results.

After the fault throw calculation is performed at block 308, a quality control check may be performed, as shown at block 310. The quality control check may be performed, for example, by comparing the output of the fault throw calculation with known observational data. If the quality check indicates that the calculated fault throw values are outside of a desirable range, process flow may return to block 302, as shown by the dashed line in FIG. 3.

When the quality control check reveals that fault throw data is within an acceptable range, the thickness of the fault zone being evaluated is computed, as shown at block 312. The equation for fault zone thickness may be optionally customized based on specific conditions, as shown by block 314. The output of the fault zone thickness calculation shown at block 312 may be saved by creating a new property, updating an existing property or by passing the calculation to an additional property. The fault thickness calculation process 312 may be executed independently from the other processes shown in FIG. 3. For independent operation, a grid representing an area of interest is chosen from an earth model.

At block 316, a DSA value is computed for the fault that is under evaluation. Optionally, a weighting process may be chosen, as shown at block 318. Exemplary weighting processes that may be employed include a weighted average or standard average. The DSA value may be computed using a volume of shale or Vsh property for the fault being evaluated. The output of the DSA calculation may be saved by creating a new property, updating an existing property, or bypassing the calculation by using an existing property.

The DSA process 316 may be executed independently from the other processes shown in FIG. 3. For independent operation, a grid representing an area of interest is chosen from an earth model. The DSA may employ an independently calculated Vsh property selected from the earth model.

Cataclastic permeability is computed, as shown at block 320. Cataclastic permeability may be calculated by multiplying the unfaulted permeability by the cataclastic reduction factor. A weighting process is used because in three dimensions there are usually many individual sand cells juxtaposed with any given sand cell on the opposite side of the fault. Since each cell has a different permeability it is necessary to average them in some way.

Cataclastic permeability is computed, as shown at block 320. Optionally, the cataclastic permeability equation may customized and a weighting process chosen, as shown at block 322. Exemplary weighting processes that may be employed include a weighted average or standard average. The output of the cataclastic permeability calculation may be saved by creating a new property, updating an existing property, or bypassing the calculation by using an existing property. The cataclastic permeability calculation process 320 may be executed independently from the other processes shown in FIG. 3. For independent operation, a grid representing an area of interest is chosen from an earth model. The cataclastic permeability calculation may employ an independently calculated permeability property. An independently calculated property identifying a value of cells of the grid as being either sand or non-sand may be selected from the earth model for the fault of interest. An independently derived permeability reduction factor may be provided for the cataclastic permeability calculation.

At block 324, fault permeability is computed for the fault being evaluated. Optionally, the fault permeability equation may be customized based on specific characteristics of the fault being evaluated, as shown at block 326. Data that is used in the fault permeability calculation process 324 may include an input shale permeability value such as ksh in equation 1. The output of the fault permeability calculation may be saved by creating a new property, updating an existing property, or bypassing the calculation by using an existing property. The fault permeability calculation process 324 may be executed independently from the other processes shown in FIG. 3. For independent operation, a grid representing an area of interest is chosen from an earth model. The fault permeability calculation may employ an independently calculated DSA value, such as from the earth model. An independently calculated property identifying a cataclastic permeability value, such as from the earth model may also be used. The fault permeability calculation may also employ an independently derived shale permeability value and a shale smear continuity factor.

An effective permeability is computed, as shown at block 328. The effective permeability is based on the fault permeability computed at block 324. Moreover, the effective permeability may comprise the volume weighted harmonic average permeability of the fault material and the adjacent cell permeability. Optionally, the effective fault permeability equation may be customized, as shown at block 330. In addition, a weighting process may be chosen 322. Exemplary weighting processes that may be employed include a weighted average or standard average. The output of the effective permeability calculation may be saved by creating a new property, updating an existing property, or bypassing the calculation by using an existing property. The effective permeability calculation process 328 may be executed independently from the other processes shown in FIG. 3. For independent operation, a grid representing an area of interest is chosen from an earth model. The effective permeability calculation may employ an independently calculated permeability value, such as from the earth model. An independently calculated fault thickness property, such as from the earth model, may also be used. The effective permeability calculation may also employ an independently derived value for shale permeability.

At block 332, the effective permeability is used to predict fluid flow. By way of example, the effective permeability may be used to predict the flow of hydrocarbon-containing fluids in a subsurface region. The predicted fluid flow may be used to improve the efficiency of extracting hydrocarbons from underground.

Figure 4:
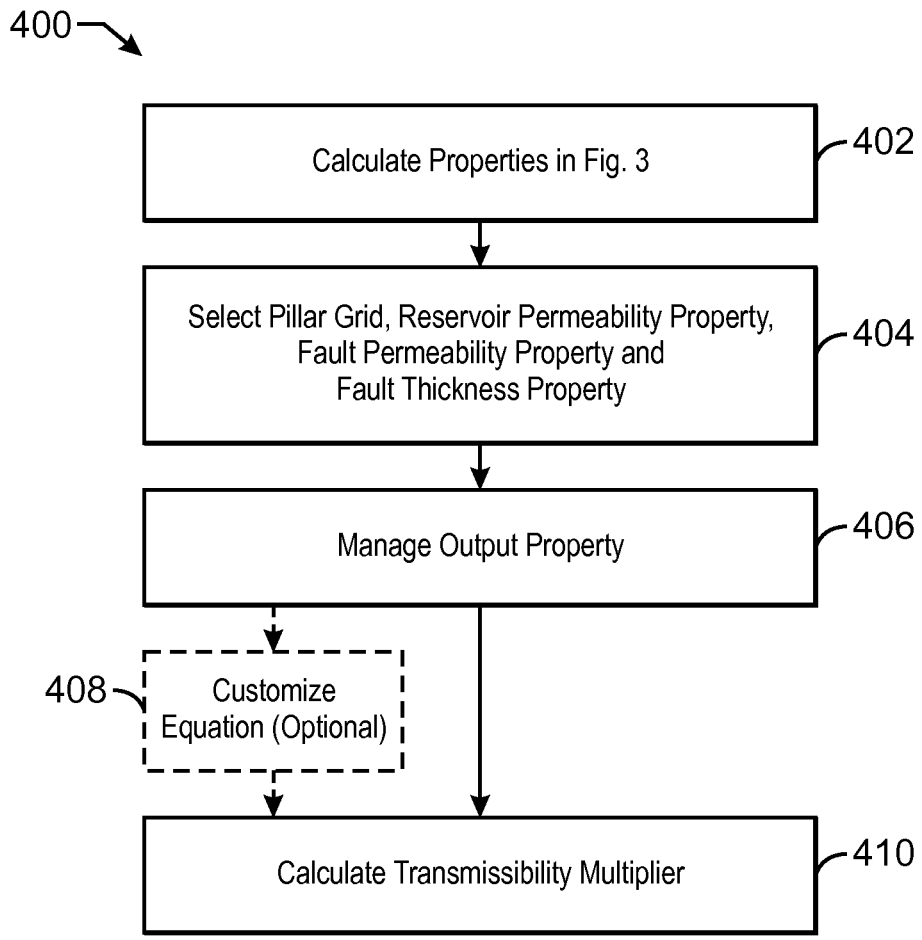
FIG. 4 is a process flow diagram showing a method for determining a range of transmissibility multipliers.

FIG. 4 is a process flow diagram showing a method for determining a range of transmissibility multipliers. The method is generally referred to by reference number 400. Moreover, the transmissibility multiplier calculation process 400 may provide a range of transmissibility multipliers for a range of fault throws. As shown at block 402, the transmissibility multiplier calculation process 400 may use as inputs one or more of the process outputs determined in a method such as the method shown in FIG. 3. At block 404, a user selects a pillar grid representing a subsurface region of interest from an earth model. In addition, the user selects a reservoir permeability property, a fault permeability property and a fault thickness property. These properties may be selected from outputs generated by the various processes shown in FIG. 3.

At block 406, the user manages the new output property, such as by storing the output of process 400 as a new property, overwriting an existing property, or using an existing property. The user may execute the transmissibility multiplier calculation by optionally using a customized transmissibility multiplier equation, as shown at block 408. A range of transmissibility multipliers is calculated, as shown at block 410. The output may be automatically written to the object selected at block 406. The output data may be viewed in a three-dimensional viewing window, or may be stored for future use, analysis, modelling, and/or fluid flow prediction.

Figure 5:
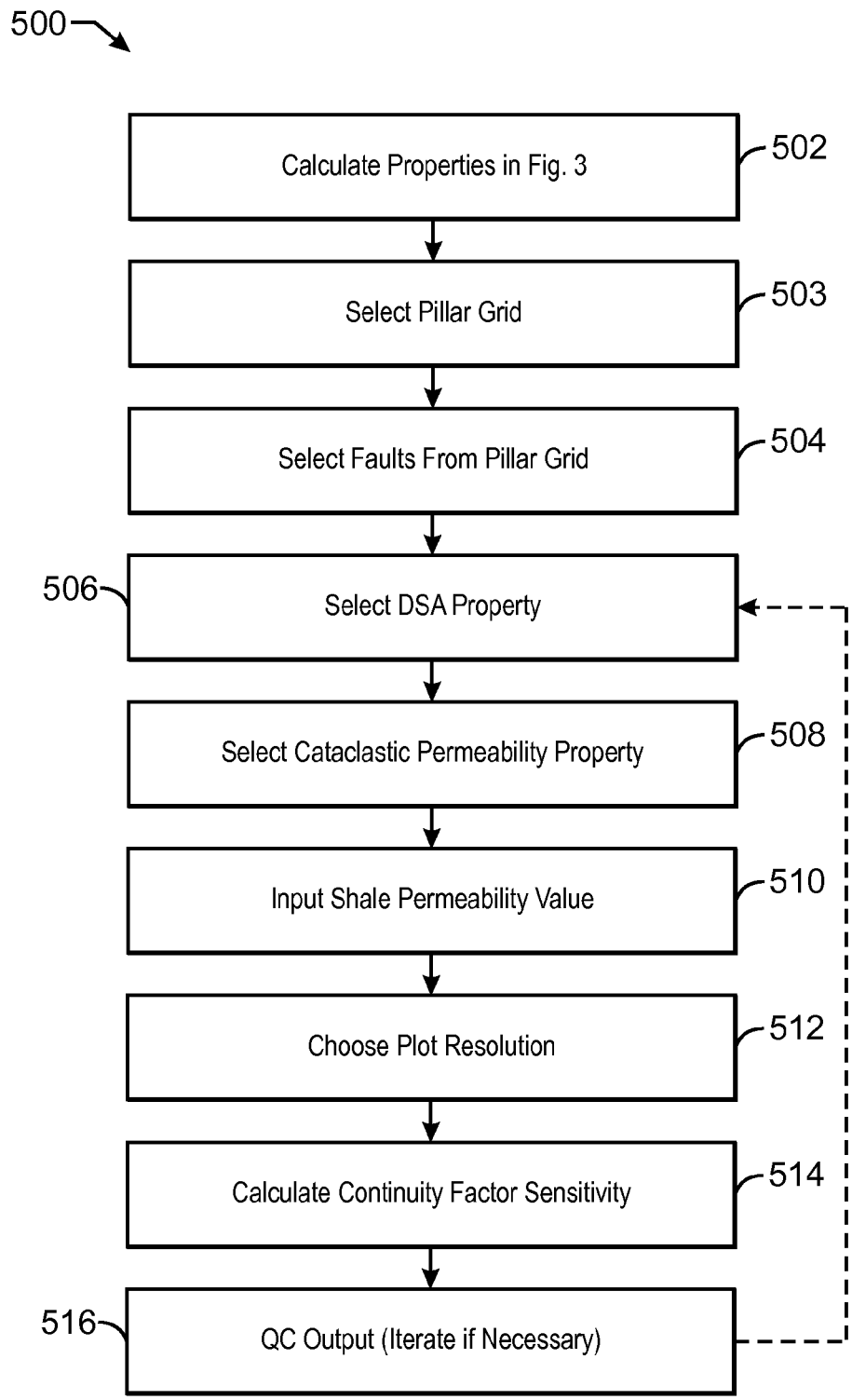
FIG. 5 is a process flow diagram showing a method for performing a continuity factor sensitivity analysis.

FIG. 5 is a process flow diagram showing a method for performing a continuity factor sensitivity analysis. The process is generally referred to by reference number 500. Process 500 is useful for determining the impact of a range of shale smear continuity factors on the calculation of permeability values for a plurality of faults with a fault permeability prediction tool/module as described herein.

As shown at block 502, process 500 may use as inputs one or more of the process outputs determined in a method such as the method shown in FIG. 3. At block 503, a user selects a pillar grid representing a subsurface region of interest from an earth model. One or more faults to be evaluated are selected, as shown at block 504. At block 506, a DSA property is selected. The DSA property may come, for example, from the earth model. A cataclastic permeability property is selected, as shown at block 508. The cataclastic permeability property may come, for example, from the earth model. A shale permeability for the faults being evaluated may be provided, as shown at block 510. The shale permeability may come, for example, from the earth model. Finally, a plot resolution is chosen, as shown at block 512.

At block 514, the fault permeability or transmissibility multiplier are calculated for the range of continuity factors input. A plot of this parameter versus the continuity factor is used to test sensitivity. A quality control check may be performed on the output data, as shown at block 516. The quality control check may be performed, for example, by comparing the output of the continuity factor sensitivity calculation with known observational data, such as throw, DSA, cataclastic permeability, and/or shale permeability, for example. If the quality check indicates that these properties are outside of a desirable range, process flow may return to block 506, as shown by the dashed line in FIG. 5.

The calculated continuity factor sensitivity data may be displayed in a plot window as a set of curves which represent continuity factor versus fault permeability for a fault or plurality of faults. The visual presentation of this display may be manipulated by a user viewing the display. As an alternative, the output of the continuity factor sensitivity calculation process may be viewed as a chart of a DSA value versus a permeability value for a fault or a plurality of faults selected.

Figure 6:
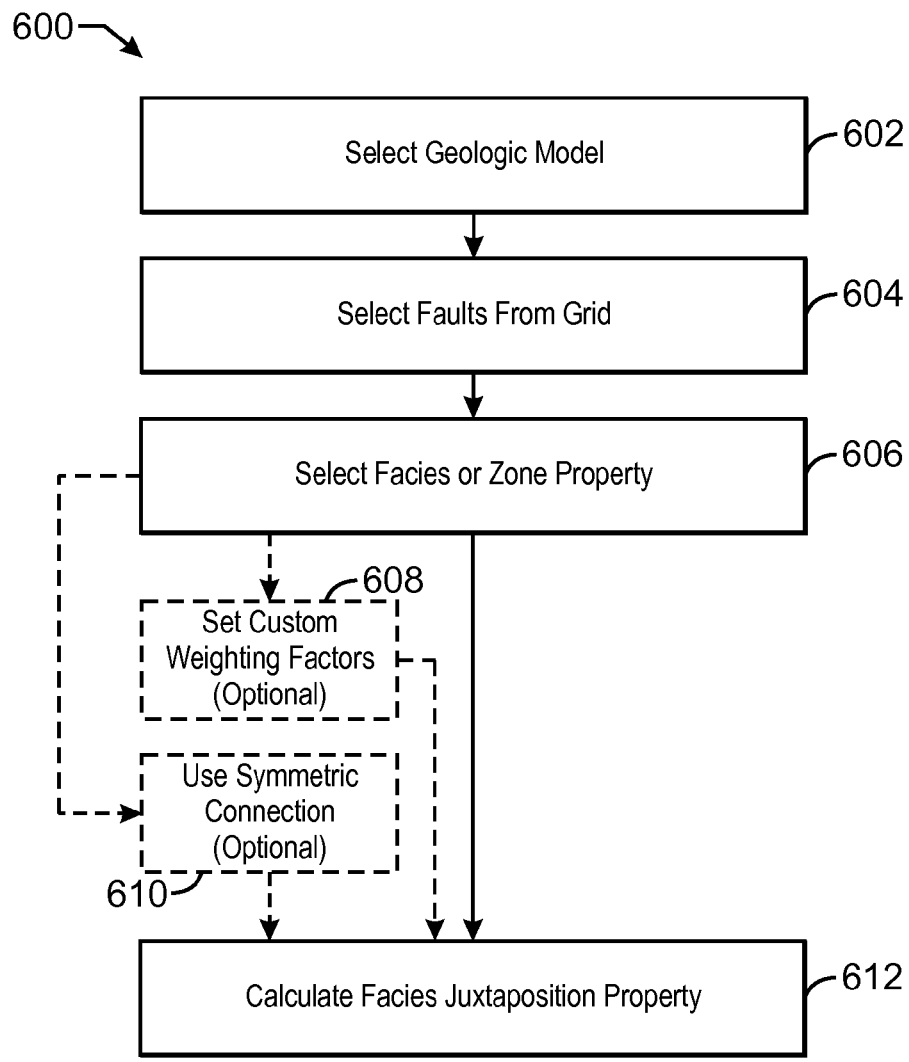
FIG. 6 is a process flow diagram showing a method for performing a facies juxtaposition analysis.

FIG. 6 is a process flow diagram showing a method for performing a facies juxtaposition analysis. The process is generally referred to by reference number 600. Process 600 provides discrete property values of cells that are juxtaposed against each other across a fault or a plurality of faults by creating a matrix of the number and location of paired discrete property values. Once having determined the property values of the juxtaposed cells, a new property is calculated to represent the juxtaposition pairing.

The facies juxtaposition analysis process 600 is predicated on a previously created earth model populated with cells for each of which a property or plurality of properties has been assigned. A geologic model is selected, as shown at block 602. The properties assigned to a subsurface region in the selected geologic model may represent an individual or a plurality of discrete geologic, geophysical, or geometric characteristics of the earth model. A particular grid may be chosen for an earth model that represents an area of interest and contains properties of interest. One or more faults of interest may be selected from the grid, as shown at block 604. The faults chosen are the subject of process 600. A specific facies or zone property such as permeability, is selected at block 606. Optionally, weighting factors may be added, as shown at block 608. In addition, a user may optionally choose to use symmetrical connections (block 610) or discard half the connections based on a premise that a first discrete value juxtaposed on a second discrete value is the same as the second discrete value juxtaposed on the first discrete value. A facies juxtaposition property is calculated, as shown at block 612. The facies juxtaposition property is represented by a matrix of cross fault cell to cell juxtapositions. A new property is created to represent the type of juxtaposition pairing. The results of process 600 may be viewed in a three-dimensional window in which a cell or plurality of cells adjacent to a fault plane are made visible.

Figure 7:
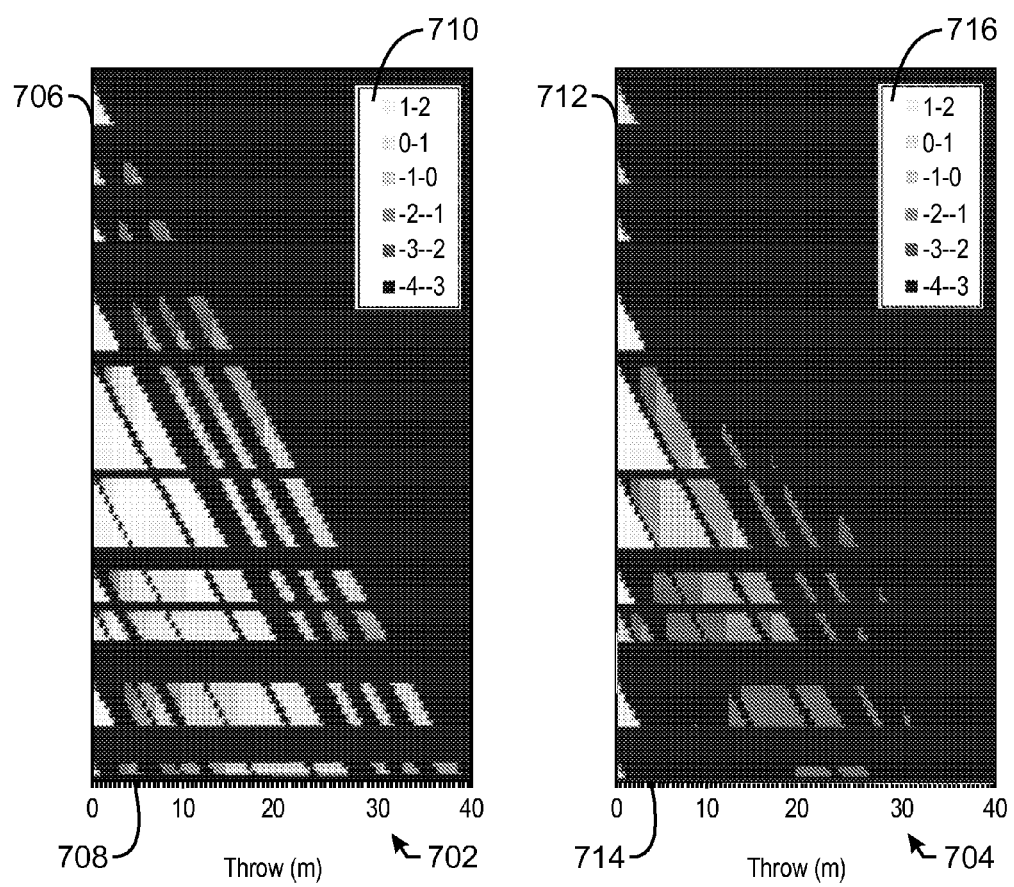
FIG. 7 is a set of graphs showing a predicted range of permeability values in or along a fault.

FIG. 7 is a set of graphs showing a predicted range of permeability values in a fault zone. The set of graphs includes a left panel 702 and a right panel 704. The left panel 702 represents a maximum expected level of permeability in a fault zone and the right panel 704 represents a minimum expected level of permeability. The left panel 702 has a y-axis 706 that corresponds to a location on a fault. X-axis 708 corresponds to a throw value within the fault in meters. A legend 710 correlates levels of shading to predicted maximum values of permeability within the fault zone. The right panel 704 has a y-axis 712 corresponding to a location on a fault. X-axis 714 corresponds to a throw value within the fault in meters. A legend 716 correlates levels of shading to predicted minimum values of permeability within the fault zone. The set of graphs shown in FIG. 7 are exemplary visual representations of the sort that may be produced according to the present techniques.

Figure 8:
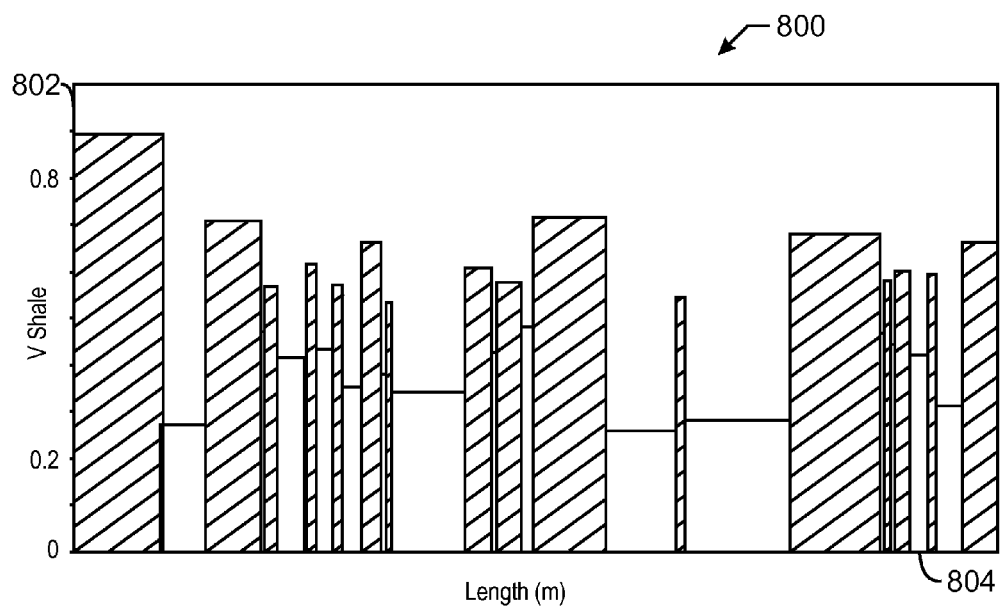
FIG. 8 is a chart showing a predicted volume of shale in a fault zone.

FIG. 8 is a chart 800 showing a volume of shale in a 1D stratigraphic model. Y-axis 802 corresponds to a predicted percentage volume of shale (Vshale) within a fault zone. X-axis 804 corresponds to a length value along the stratigraphic model in meters. The chart 800 is an exemplary visual representation of the sort that may be used for input to the present techniques.

Figure 9:
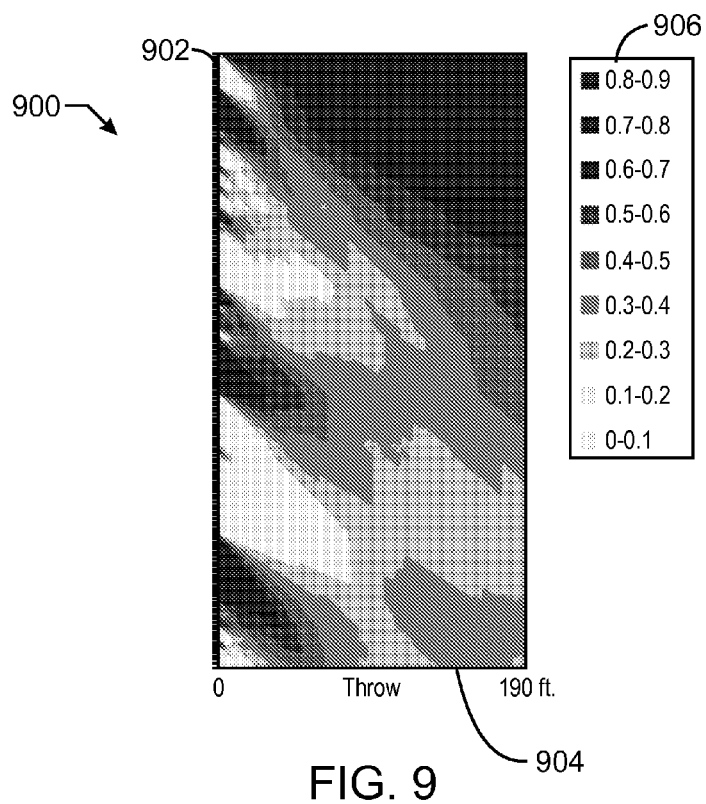
FIG. 9 is a graph showing predicted DSA values in a fault zone.

FIG. 9 is a graph 900 showing DSA values in a fault zone offsetting the 1D stratigraphic model shown in FIG. 8. Y-axis 902 corresponds to a location on a fault. X-axis 904 corresponds to a throw value within the fault in feet. A legend 906 corresponds to predicted DSA values within the fault zone. The graph 900 is an exemplary visual representation of the sort that may be produced according to the present techniques.

Figure 10:
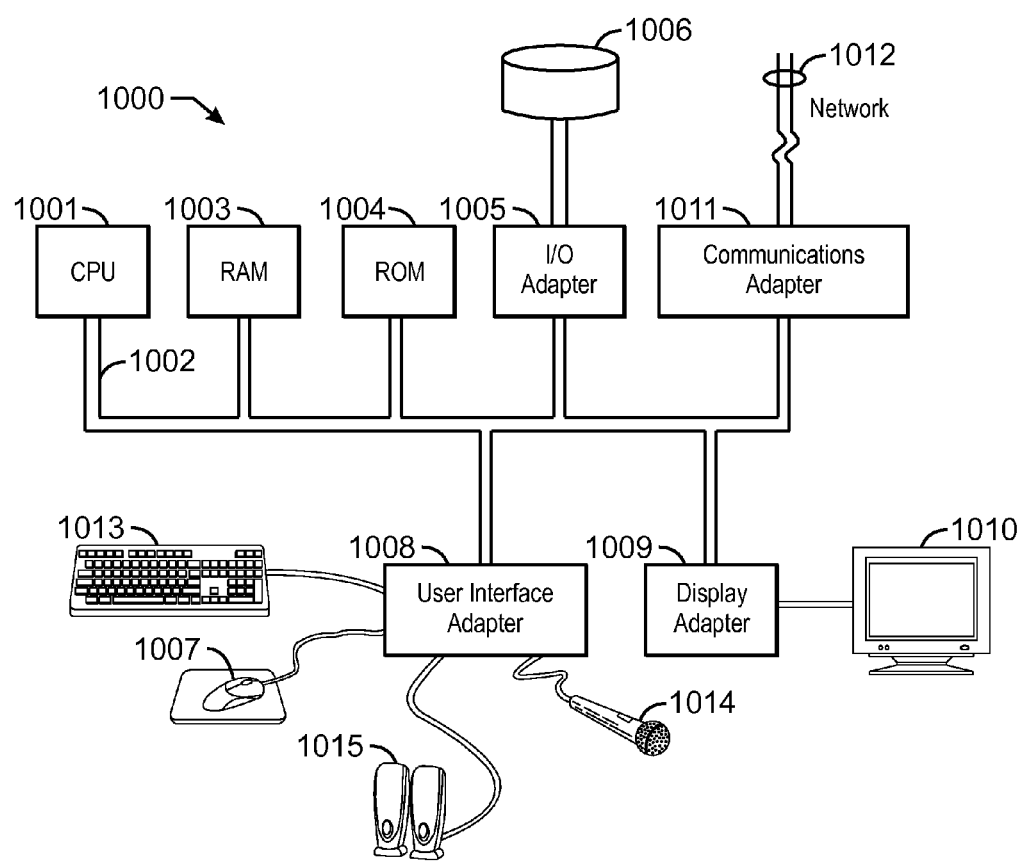
FIG. 10 is a block diagram of an exemplary computer network that may be used to perform a method for predicting fluid flow as disclosed herein.

FIG. 10 illustrates a computer system 1000 on which software for performing processing operations or process steps or blocks as disclosed herein may be implemented. A central processing unit (CPU) 1001 is coupled to system bus 1002. The CPU 1001 may be any general-purpose CPU, although other types or architectures of CPU 1001 (or other components of exemplary system 1000) may be used as long as CPU 1001 (and other components of system 1000) supports the inventive operations as described herein. CPU 1001 may execute the various logical instructions according to embodiments. For example, the CPU 1001 may execute machine-level instructions for performing processing according to the exemplary operational flow described above in conjunction with FIG. 1, FIG. 2, FIG. 3, FIG. 4, FIG. 5 or FIG. 6. For instance, CPU 1001 may execute machine-level instructions for performing operational block 612 of FIG. 6.

Computer system 1000 may also include random access memory (RAM) 1003, which may be SRAM, DRAM, SDRAM, or the like. Computer system 1000 may also include read-only memory (ROM) 1004 which may be PROM, EPROM, EEPROM, or the like. RAM 1003 and ROM 1004 hold user and system data and programs, as is known in the art. Computer system 1000 may also include an input/output (I/O) adapter 1005, a communications adapter 1011, a user interface adapter 1008, and a display adapter 1009. The I/O adapter 1005, the user interface adapter 1008, and/or communications adapter 1011 may, in certain embodiments, enable a user to interact with computer system 1000 in order to input information.

The I/O adapter 1005 may connect a storage device(s) 1006, such as one or more of a hard drive, compact disc (CD) drive, floppy disk drive, tape drive, etc. to computer system 1000. The storage device(s) may be used when RAM 1003 is insufficient for the memory requirements associated with storing data for operations of embodiments of the present invention. The data storage of the computer system 1000 may be used for storing information and/or other data used or generated as disclosed herein. Communications adapter 1011 may couple computer system 1000 to a network 1012, which may enable information to be input to and/or output from system 1000 via network 1012 (e.g., the Internet or other wide-area network, a local-area network, a public or private switched telephony network, a wireless network, or any combination of the foregoing). User interface adapter 1008 couples user input devices, such as a keyboard 1013, a pointing device 1007, and a microphone 1014 and/or output devices, such as a speaker(s) 1015 to the computer system 1000. The display adapter 1009 is driven by the CPU 1001 to control the display on a display device 1010 to, for example, display information or a representation pertaining to a portion of a subsurface region under analysis, such as displaying a generated 3D representation of a target area, according to certain embodiments.

The architecture of system 1000 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

The disclosed aspects may be susceptible to various modifications and alternative forms, and the exemplary embodiments discussed above have been shown only by way of example. However, the disclosed aspects are not limited to the particular embodiments disclosed herein. Indeed, the disclosed aspects include all alternatives, modifications, and equivalents falling within the spirit and scope of the appended claims.

What is claimed is:

1. A computer implemented method for predicting fluid flow, the method comprising:
   obtaining data describing a stratigraphy, the stratigraphy comprising a fault;
   predicting a volume of shale in the fault; calculating a thickness of the fault;
   calculating a permeability of the fault based on the volume of shale, the thickness, an estimated shale smear continuity factor and an estimated cataclastic reduction factor, wherein calculating permeability of the fault is performed using the following formulation:

$$k_f = (Fvsh*ksh^{(1-2Cf)} + (1-Fvsh)*(kss*kcat)^{(1-2Cf)})^{-(1-2Cf)},$$

where $k_f$ represents the permeability of composite fault zone material at point of interest, Fvsh represents volume of shale in the fault at point of interest, ksh represents permeability of the shale-based fault zone material, kss represents the permeability of sand-based fault zone material, kcat represents the cataclastic reduction factor and Cf represents a shale smear continuity factor; and
       using a computer to predict fluid flow in a subsurface region based on the fault permeability.

2. The computer implemented method for predicting fluid flow recited in claim 1, wherein the shale smear continuity factor comprises a range.

3. The computer implemented method for predicting fluid flow recited in claim 1, wherein the shale smear continuity factor comprises a probability.

4. The computer implemented method for predicting fluid flow recited in claim 1, wherein the cataclastic reduction factor comprises a range.

5. The computer implemented method for predicting fluid flow recited in claim 1, wherein the cataclastic reduction factor comprises a probability.

6. The computer implemented method for predicting fluid flow recited in claim 1, comprising calculating a transmissibility multiplier based on the fault permeability.

7. The computer implemented method for predicting fluid flow recited in claim 1, comprising transforming the fault permeability into a visual representation of the subsurface region.

8. The computer implemented method for predicting fluid flow recited in claim 7, wherein the visual representation comprises a chart.

9. The computer implemented method for predicting fluid flow recited in claim 7, wherein the visual representation comprises a map.

10. The computer implemented method for predicting fluid flow recited in claim 1, comprising filtering data corresponding to the fault permeability based on a minimum desired value or a maximum desired value.

11. The computer implemented method for predicting fluid flow recited in claim 1, wherein the data describing the stratigraphy comprises one-dimensional data, two-dimensional data or three-dimensional data.

12. A method for producing hydrocarbons from an oil and/or gas field, the method comprising:
    obtaining data describing a stratigraphy, the stratigraphy comprising a fault;
    predicting a volume of shale in the fault;
    calculating a thickness of the fault;
    calculating a permeability of the fault based on the volume of shale, the thickness, an estimated shale smear continuity factor and an estimated cataclastic reduction factor, wherein calculating permeability of the fault is performed using the following formulation:

$$k_f = (Fvsh*ksh^{(1-2Cf)} + (1-Fvsh)*(kss*kcat)^{(1-2Cf)})^{-(1-2Cf)},$$

where $k_f$ represents the permeability of composite fault zone material at point of interest, Fvsh represents volume of shale in the fault at point of interest, ksh represents permeability of the shale-based fault zone material, kss represents the permeability of sand-based fault zone material, kcat represents the cataclastic reduction factor and Cf represents a shale smear continuity factor; and predicting fluid flow in a subsurface region based on the fault permeability; and
        extracting hydrocarbons from the oil and/or gas field using the predicted fluid flow.

13. The method for producing hydrocarbons recited in claim 12, wherein the shale smear continuity factor comprises a range.

14. The method for producing hydrocarbons recited in claim 12, wherein the shale smear continuity factor comprises a probability.

15. The method for producing hydrocarbons recited in claim 12, wherein the cataclastic reduction factor comprises a range.

16. The method for producing hydrocarbons recited in claim 12, wherein the cataclastic reduction factor comprises a probability.

17. The method for producing hydrocarbons recited in claim 12, comprising performing a quality control check to determine whether the fault permeability is within an acceptable range.

18. The method for producing hydrocarbons recited in claim 12, comprising transforming the fault permeability into a visual representation of the subsurface region.

19. The method for producing hydrocarbons recited in claim 18, wherein the visual representation comprises a chart.

20. The method for producing hydrocarbons recited in claim 18, wherein the visual representation comprises a map.

21. The method for producing hydrocarbons recited in claim 12, wherein the data describing the stratigraphy comprises one-dimensional data, two-dimensional data or three-dimensional data.

22. A computer system that is adapted to predict fluid flow, the computer system comprising: a processor; and
    a non-transitory, machine-readable storage medium that stores, machine-readable instructions for execution by the processor, the non-transitory, machine-readable instructions comprising:
    code that is adapted to obtain data describing a stratigraphy, the stratigraphy comprising a fault;
    code adapted to predict a volume of shale in the fault;
    code adapted to calculate a thickness of the fault;
    code adapted to calculate a permeability of the fault based on the volume of shale, the thickness, an estimated shale smear continuity factor and an estimated cataclastic reduction factor, wherein calculating permeability of the fault is performed using the following formulation:

$$k_f = (Fvsh*ksh^{(1-2Cf)} + (1-Fvsh)*(kss*kcat)^{(1-2Cf)})^{-(1-2Cf)},$$

where $k_f$ represents the permeability of composite fault zone material at point of interest, Fvsh represents volume of shale in the fault at point of interest, ksh represents permeability of the shale-based fault zone material, kss represents the permeability of sand-based fault zone material, kcat represents the cataclastic reduction factor and Cf represents a shale smear continuity factor; and
        code adapted to predict fluid flow in a subsurface region based on the fault permeability.

* * * * *